Feb. 4, 1936.                H. F. FISHER                2,029,527
                         ELECTRICAL DEHYDRATOR
                         Filed May 8, 1933           2 Sheets-Sheet 1
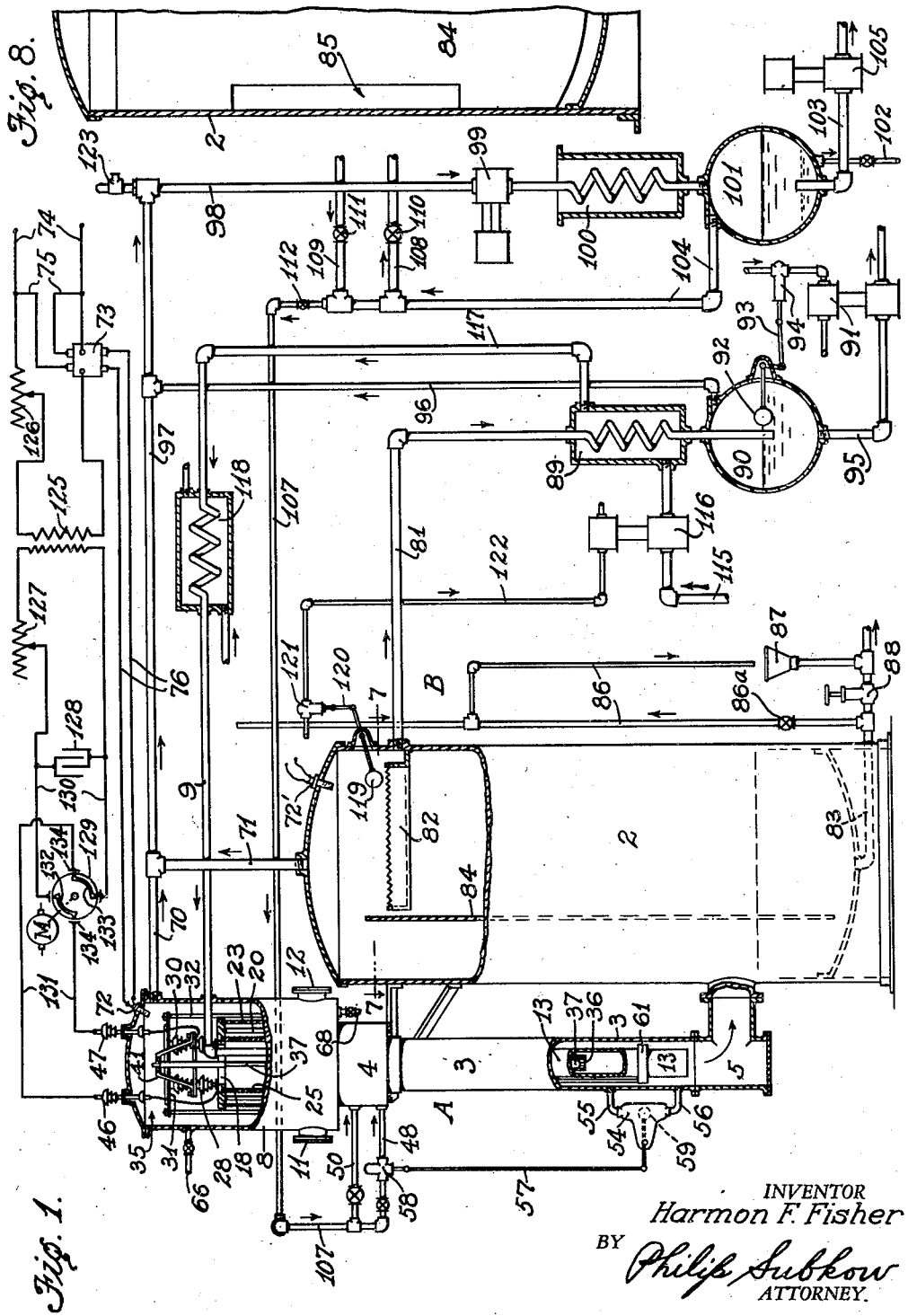
INVENTOR
Harmon F. Fisher
BY
Philip Subkow
ATTORNEY.

Feb. 4, 1936.  H. F. FISHER  2,029,527
ELECTRICAL DEHYDRATOR
Filed May 8, 1933  2 Sheets-Sheet 2
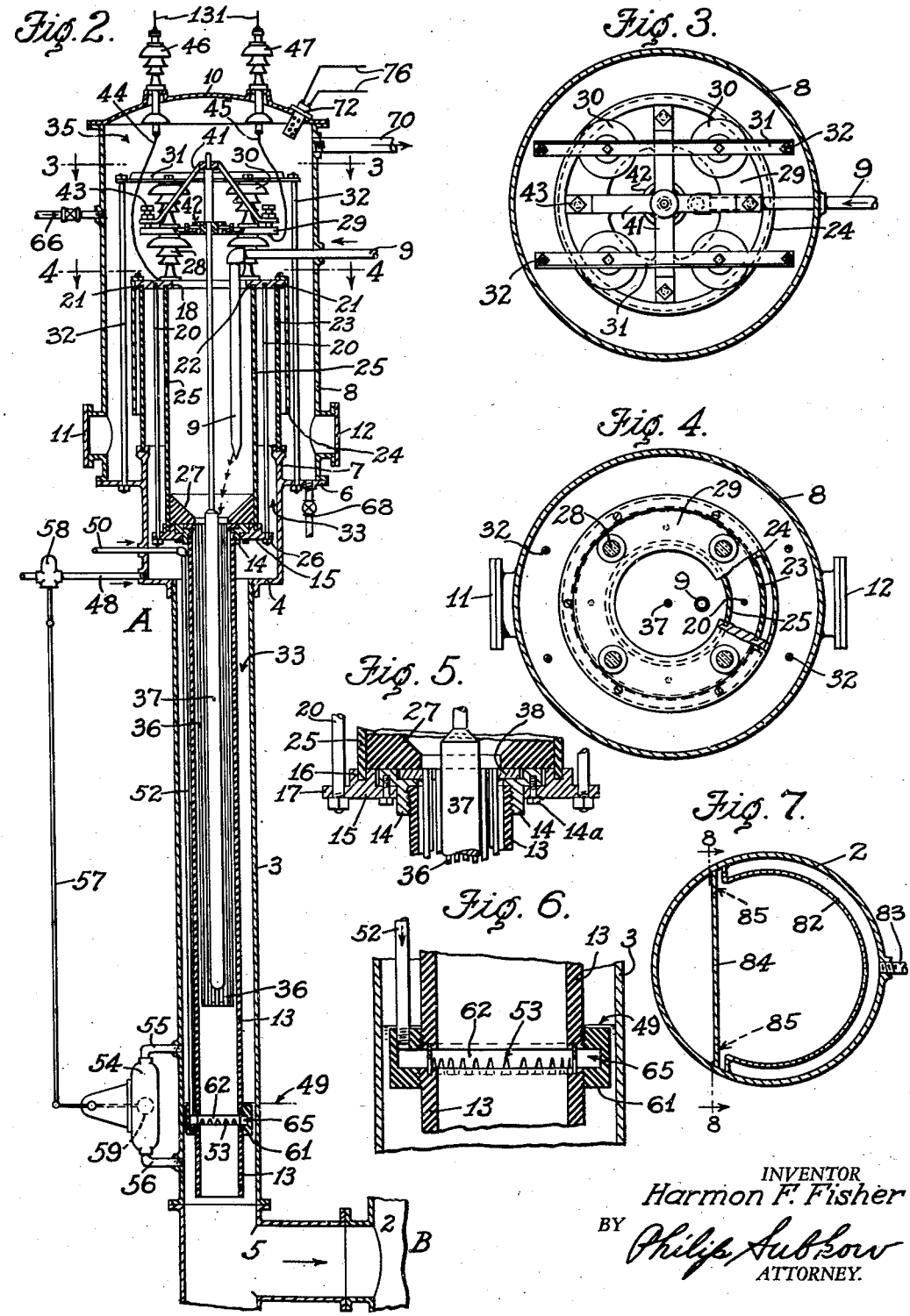
INVENTOR
Harmon F. Fisher
BY
Philip Subrow
ATTORNEY.

Patented Feb. 4, 1936

2,029,527

UNITED STATES PATENT OFFICE 2,029,527

ELECTRICAL DEHYDRATOR

Harmon F. Fisher, Los Angeles, Calif., assignor to Union Oil Company of California, Los Angeles, Calif., a corporation of California Application May 8, 1933, Serial No. 669,844

8 Claims. (Cl. 204—24)

This invention relates to the art of separating the constituents of an emulsion and particularly to the electrical dehydration of petroleum emulsions.

Crude petroleum from the well is usually associated in part with water in a finely divided and thoroughly mixed state, known as emulsification. The water thus entrapped in the oil as produced from the well will not settle or separate from the oil by gravity in any length of time, and it has been the practice to treat this emulsion electrically by subjecting it to an electric field of high voltage gradient. Such electrical treatment causes an agglomeration of the finely divided water particles in the emulsion, until water particles of large enough size and great enough weight are formed to allow settling and separation by gravity.

In most cases where agglomeration of the emulsified water particles is thus brought about and where the electric field is set up by conventional continuous high voltage alternating current, short circuiting of the electric field by aligned water particles or chains occurs almost immediately, and this short circuited condition persists indefinitely resulting in a reduction of the electric treating field to such an extent that treatment is impaired or rendered entirely ineffective.

To obviate the loss in effective treating potential by short circuiting water chains or bodies, high velocity treatment and/or recirculation of dry dielectric oil have heretofore been employed, resulting in inefficiency of treatment, reduction of capacity and non-uniformity of operation and regulation. Moreover, in many cases with the conventional treater it has been impossible to obtain satisfactory de-emulsification without the simultaneous aid of chemicals.

It is the object of this invention to overcome the above enumerated disadvantages of the common dehydration methods and to provide a novel form of treater and method of treatment which will be efficient, economical, of high capacity, simple and uniform in operation and capable of effectively treating emulsions which heretofore have been difficult, if not impossible, to treat by electrical methods alone.

It is a further object to provide a method and apparatus capable of operating simply and uniformly over a wide range of types of emulsions.

It is another object to provide a process and apparatus which will effectively dehydrate emulsions having short circuiting tendencies and/or of very high water content and correspondingly extremely low electrical resistances.

It is a further object to provide an apparatus in which the treating field is concentrated and practically limited to the zone in which treatment of the emulsion takes place.

It is a further object to provide treater apparatus which will be inherently unaffected by short circuiting conditions in the treating zone.

It is a further object to provide apparatus capable of producing a more intense treating field with an electrical supply of moderate capacity than has been heretofore possible.

It is another object to provide a process and apparatus not dependent upon emulsion velocity for efficient treater performance.

It is also an object of this invention to provide a process and apparatus not dependent upon circulation of dry oil or mixtures of emulsions to obtain operative conditions.

Some of the more important features of the invention are included in the following: a treater which utilizes an intense electrical condenser discharge through the emulsion to be treated; a treater with electrodes and electrical system insulated from the treater shell; a treater having co-axial cylindrical electrodes having diametrical ratios adapted for maximum efficiency, namely diametrical ratios of 1:2; a utilization of gas injection into the treating zone for increased efficiency and uniformity of treatment; a system for recirculating the gas from the treater and/or a settling tank back to the treating zone; insulation of the electrodes and treating zone from the treater shell by maintenance of an insulating gas space around said electrodes and treating zone; removal of condensable products from the gases evolved from the treater and separator (settling tank) before disposal or recirculation.

This invention is embodied in apparatus comprising a treating zone inside of a gas tight metallic enclosure, said treating zone comprising an elongated annular space between elongated electrodes which are both electrically insulated from the metallic enclosure, having in operation an intense electric field induced between them through said annular space. Preferably said electrodes are of limited area and specified diametral ratios. Means comprising an insulating or dielectric conduit serve to confine the emulsion to the annular treating zone between the electrodes. Means are provided to isolate the electrodes, insulating conduit and treating zone from the metallic enclosure by maintaining gas spaces therearound, and means may also be associated therewith to inject a gas into the emulsion in the treating zone for agitation and/or to aid treatment. This embodiment also includes a source of interrupted and/or intermittent electrical condenser discharges for energizing the electrodes to produce an intense electric treating field in the above mentioned treating zone, and separate settling and separating means into which the treated emulsion discharges.

Broadly stated the invention may be considered as residing in a treater having two spaced electrodes; both of the electrodes and the treating zone being insulated electrically from the treater shell and from each other, together with means to confine the emulsion being treated to the treating zone between the electrodes. The invention also includes in such a structure, means to maintain an insulating gas space outside of and around that portion of the treater structure in which the treating zone is confined.

The invention in another of its broad aspects also includes means and a method for injecting gas into the treating zone and into the emulsion undergoing treatment to aid and increase the effectiveness of treatment. Additionally, this invention includes separating and segregating the gas evolved from the emulsion in the treating zone and withdrawing and returning this gas for re-injection into the treating zone.

In another of its generic aspects, the invention further includes the employment of an interrupted treating current or potential along with simultaneous agitation of the emulsion undergoing treatment. The invention moreover also includes the combined use of an interrupted potential or an intermittent condenser discharge through the emulsion with simultaneous gas injection into the said emulsion.

The invention further resides in an electrical supply system combining a transformer, capacities, inductances and/or impedances designed to deliver a maximum current impulse at a maximum voltage.

This invention includes a gas sensitive device to isolate the electrical supply from the treater when the gas mixture therein approaches an explosive or otherwise hazardous condition.

The invention also includes employment of an elongated outer annular electrode or annularly disposed electrodes and a central coaxial cylindrical inner electrode, the ratios of diameters of said inner and outer electrodes being proportioned for maximum efficiency and effectiveness of treatment of emulsion therebetween, the diametral ratio being preferably 1:2.

The invention includes not only the apparatus improvements but also the methods of operation. In connection with the apparatus and method for treating emulsions and for injecting and recirculating gases, the invention includes also the features and steps for compressing, cooling, and condensing and recovering condensable constituents therefrom.

Other objects and advantages of the invention will be evident hereinafter.

In the accompanying drawings wherein one embodiment of this invention is illustrated:

Figure 1 is a view partially in elevation, partially in vertical section and partially diagrammatic showing the general assembly of apparatus;

Figure 2 is a sectional elevation of the electrical treater unit;

Figure 3 is a plan section taken through the treater unit on line 3—3 of Figure 2 showing the upper portion of the electrode supporting structure.

Figure 4 is a cross section of the treater unit taken on line 4—4 of Figure 2 showing the lower portion of the electrode supporting structure;

Figure 5 is a fragmentary vertical sectional detail through the upper end of the treater unit electrodes at the upper entrance to the treating zone proper;

Figure 6 is a fragmentary vertical sectional detail of the lower portion of the treater at the gas injection orifices;

Figure 7 is a transverse section of the settling tank taken on line 7—7 of Figure 1; and Figure 8 is a fragmentary sectional elevation of the settling tank taken on line 8—8 of Figure 7 showing a portion of the baffle structure.

The apparatus illustrated comprises two main units, a treater unit A and a separating unit B including a settling tank 2 shown in sectional elevation in Figure 1. The treater unit A (Figure 2) comprises a lower elongated cylindrical metallic housing section 3 terminating at its lower end in a large T fitting 5, whose lateral branch forms the outlet connection from the treater to the settling tank 2 of unit B. The upper end of section 3 is screw connected into an intermediate short metallic cylindrical section 4 of increased diameter having at its upper end a horizontal annular flange 6 and an upstanding annular flange 7; section 4 thus forms an intermediate housing section. A cylindrical top section 8 of still further increased diameter rests upon and is bolted to the flange 6 to constitute the upper housing section of the treater. An emulsion inlet connection 9 projects through the side of the section 8, and a removable top 10 is provided to close the upper end of the treater and also to permit removal of an internal assembly from the top of the treater when desired. Section 8 is also provided with inspection windows 11 and 12, located in its lower portion.

Within the lower enclosing section 3 there is concentrically positioned an insulating or dielectric conduit 13 which extends throughout a major portion of the length of said section 3, the lower end of conduit 13 terminating a short distance above the outlet 5 and its upper end having a screwed connection with an annular supporting flange or ring 14 which rests in and preferably is bolted at 14a (Figure 5) to a supporting flange ring 15 suspended in the upper treater section 4. The supporting flange ring 15 is provided with a grooved upstanding annular flange 16 and a horizontal annular bolt flange 17. The supporting flange 15 is in turn supported from an upper annular flange or ring 18 by means of tie-bolts 20 which are threaded into the flange 18 and extend downward through bolt holes in the flange 17 and are secured therein, thereby supporting the weight of the flange 15 and the conduit 13 and its attached members. The flange 18 is provided on its under side with concentric annular grooves 21 and 22, and the outermost groove 21 receives the upper end of a cylindrical insulating section 23 which is supported in a groove in the upper edge of the upstanding annular flange 7 of the housing section 4, whereby the flange 18 and parts suspended therefrom are supported upon the intermediate treater section 4. A metallic shield 24 electrically connected to and supported by the annular flange 18 is provided to protect the supporting insulator 23 from being wetted by condensations and splashed emulsion, and also to reduce the electrostatic stress across the insulator 23 between flange 18 and the grounded shell 8. The inner annular groove 22 on the underside of flange 18 receives the upper end of a cylindrical insulating section 25 whose lower end engages in the upwardly directed annular groove in the upstanding flange 16 of supporting flange 15. Thus the tie bolts 20 by means of tightening nuts 26 serve to bind the supporting flange 15 and the flange 18 upon the opposite ends of cylinder 23 and also upon the opposite ends of cylinder 25 so that the latter constitutes a liquid receiving chamber in communication with the interior of conduit 13. In order to partially insulate the metallic supporting flanges 14 and 15 from the contents of this chamber an insulating ring 27 is positioned to cover the flanges and prevent a treating field between the flanges and the upper portion of a center electrode, presently to be described.

On the top face of annular flange or ring member 18 at equal angular intervals there is carried a set of four petticoated insulators 28 and on these insulators is supported a horizontal framework 29 (Figure 2). Directly above the said petticoated insulators 28 on the frame 29 is positioned another set of four petticoated insulators 30 on top of which is placed a clamping frame 31 (Figures 2 and 3), through the medium of which said insulating supporting tubing or cylinder 23 is placed further under compression by means of tie bolts 32 and insulators 28 and 30. This construction and the positioning of the ends of cylinders 23 and 25 in the grooves of the parts 7, 15 and 18 is such as to insure gas-tight joints, and the same is true of the joints between parts 13, 14 and 15. This results in a gas-tight gas chamber 33 bounded by the cylinders 23 and 25, flanges 15 and 18, sleeve 13 and enclosing cylindrical sections 3 and 4. The upward forces upon the internal structure caused by gas pressures in the gas space 33 are, of course, transmitted to the shell structure 3, 4 by way of flange or ring 18, insulators 28, 30, frame 31, tie bolts 32 and flange 6. The insulating tubes 23 and 25 thus serve not only to form the upper portion of gas chamber 33 but also to establish an upper chamber 35 within shell section 8 and cylinder 25, which upper chamber 35 has communication with gas chamber 33 only by way of and around the lower end of conduit 13.

Inside of insulating conduit 13 is contained an annularly disposed electrode 36 and a center cylindrical electrode 37. Electrode 36 as shown is of grid or basket form composed of rods longitudinally supported adjacent the inner wall of said insulating conduit 13 by a ring 38 supported on flange 14, to which ring 38 the electrode rods are attached (Figure 5). Electrode 36 may also be formed of screen, helically wound wire, slotted pipe, or any other form but preferably one that will, while distributing the field uniformly, at the same time, have a limited area directly opposed to rod electrode 37. Electrode 37 is coaxially disposed with respect to grid electrode 36, its reduced upper portion extending up to a point of support in a pyramidal structure 41 which in turn rests upon the cross frame 29 supported between the insulators 28 and 30. Electrode 37 is thus electrically insulated from the treater shell structure. Since grid electrode 36 is supported by insulating tube 23 and is insulated from electrode 37 by insulators 28, and since both are insulated from the shell structure by insulators 30, the electrical isolation of both electrodes from the shell and from each other is complete.

For the purpose of shifting rod electrode 37 from side to side to make lateral adjustment within electrode 36 an adjustable mounting 42 with adjusting screws is provided in the center of frame 29 to support and position said electrode 37. Also set screws 43 on the outer ends of pyramidal structure 41 serve to position structure 41 on frame 29 and to make alignment adjustments of electrode 37. Electrical connections from electrodes 36 and 37 are completed to the outside of the treater shell through connections 44 and 45 and lead-in insulators 46 and 47, respectively, in cover 10. The whole electrode assembly may be elevated through the top of the treater after removing the cover 10.

A gas inlet connection 48 is provided into the lower portion of the treater shell 4. Gas injected at this point under sufficient pressure maintains a gas space in the treater around the insulating conduit 13 by depressing and maintaining the liquid level therein at a point 49 below the lower end of the electrodes at all times while operating the treater. Another gas inlet connection 50 leading to insulating piping 52, provides an agitation-gas supply to a set of injection orifices 53 (Figure 6) in the lower extension of the conduit 13. This pipe can be omitted and agitation gas be allowed to pass through the orifices directly from the gas space by further depressing the liquid level 49 surrounding the lower end of conduit 13 to a level opposite discharge orifices 53. The separate gas connection is desirable in some cases, however, to allow independent or more positive regulation and variation of the quantity injected into the treating zone. A liquid level control 54 is provided by which the quantity of gas or gas pressure in the gas space around conduit 13 can be varied to maintain said liquid level at the desired point, as at 49. This liquid level regulator comprises a float control 54 connected by pipes 55 and 56 to the treater, suitable linkage 57 connecting the control with a pressure regulating valve 58 on the gas inlet line 48. When the liquid level at 49 rises the float 59 in control 54 rises thus lowering linkage 57 and opening valve 58 to allow an increase of gas pressure in the treater. When the liquid level at 49 drops the reverse action takes place. This tends to maintain liquid level 49 within narrow limits.

The orifices 53 are placed near the lower end of conduit 13 at a junction between two sections of insulation tubing forming the conduit 13. A coupling 61 (Figure 6) serves to join these sections of tubing and at the same time serves as a distributor of the gas to the orifice openings 53, which are in the form of notches in one edge of an annular metal strip 62 whose opposite edges are positioned in grooves cut in the adjacent ends of the conduit sections 13. Thus, gas reaches the openings 53 in the orifice strip 62 from pipe 52 through an annular passage 65 in the coupling 61.

Near the top of the apparatus a steam connection 66 is provided through which steam may be injected into the upper treater chamber 35 for the purpose of displacing explosive gas mixtures therein, washing and cleaning insulators and other interior parts and/or heating the treater. Also a drain connection 68 is provided in flange 6 of shell section 4 for withdrawal of condensed and splashed liquids from the outer annular portion of said treater chamber 35 which surrounds the insulator 23 and its supporting flange 7.

The liquid which is introduced into treater A through pipe 9 passes down through conduit 13 for treatment between electrodes 36 and 37 and discharges through T 5 into settling tank 2. A line 70 provided near the top of treater A, makes connection with the top of the settling chamber 2 through a connection 71. The pressures in the treater unit A and settling tank 2 are thus equalized, and the liquid level in the treating zone can, therefore, be regulated by the liquid level in the settling tank and maintained at all times at a position approximately on a level with the bottom of flange 15.

A gas conductivity cell 72 is provided in the gas space in the treater, said cell being capable, when connected with suitable switching aparatus 73, of disconnecting the power supply to the treater when the oxygen in the gas space reaches a predetermined proportion. The gas conductivity cell is of the well known type containing a heated filament, the conductivity of which is varied by the change of temperature caused by combustion of gases contacting said filament. Electrical supply for operation of both the conductivity cell 72 and the switching mechanism 73 is obtained from main supply lines 74 through leads 75, cell 72 and switching apparatus 73 being connected by lines 76. A similar gas sensitive device 72' may be placed in the settling tank working independently or in conjunction with the one in the treater. The main supply lines 74 mentioned are those supplying the treater-potential supply apparatus presently to be described.

The settling tank 2 of the separating unit B comprises a shell having the treated-emulsion inlet T 5 connected thereto near its lower end. Separated oil is discharged from tank 2 near the top through a line 81 leading from launder 82, and water is discharged through drain 83 at the bottom of the tank. A baffle 84 in the tank extends from a point near the bottom to a point slightly above the normal liquid level and reaches transversely across the tank in front of the treated-emulsion inlet 5. Openings 85 (Figures 7 and 8) in the sides of the baffle 84 allow emulsion to flow around as well as under the baffle. The baffle serves to reduce turbulence caused by the velocity of the incoming treated-emulsion stream and aids settling and separation in the portion of the tank shielded by said baffle.

Outside the tank 2 a water leg 86 with funnel 87 is provided for semi-automatic regulation of water drain from the bottom of the settling tank, while serving at the same time to prevent the tank and treater from being accidentally siphoned dry upon failure of the emulsion supply. A valve 86a in leg 86 serves further to regulate the flow of separated water from the tank. A valve 88 is provided in a direct cross connection for completely emptying the settling tank.

The separated oil from tank 2 is conducted by pipe 81 to an interchanger 89 in which heat is exchanged between the hot, separated, dry oil from the settling tank, and the cool inflowing emulsion fed to the treater by line 9. The separated oil passes through to a liquid level control and surge chamber 90 from which a pump 91 takes suction. The operation of pump 90 is regulated by means of a float control 92 in tank 90 through mechanical linkage 93 to a valve 94 supplying steam to the pump 91. The dry oil is thus pumped from the surge chamber 90 through suction pipe 95 to storage. Chamber 90 is vented and pressure equalized through vent pipe 96.

Gas lines 70, 71 and 96 from treater A, tank 2 and surge chamber 90 are all connected with a common gas line 97 which communicates with a line 98 leading to a compressor 99, which discharges into a cooler 100 provided to receive and cool the compressed gases and condense the vapors. A drum 101 receives all separated water, hydrocarbon condensate such as gasoline, and gases from the cooler 100, and these constituents are drawn off through connections 102, 103 and 104, respectively. Pump 105 receives the hydrocarbon condensate through 103 and delivers it to storage. Water drawn off through 102 is disposed of in any suitable manner. Gas vented from drum 101 through 104 under pressure of pump 99 is returned in part to the treater through line 107 for injection into the treating zone through lines 48 and 50 as explained above. The rest of the said gas may be disposed of through disposal line 108. In case the gases recovered from chamber 101 are of insufficient volume for injection into the treater, additional gas may be supplied through gas make-up line 109. Valves 110, 111 and 112 serve to regulate the proportions and quantities of injection, waste and make-up gases.

Fresh emulsion is delivered from storage to interchanger 89 through a feed pipe 115 by a feed pump 116 and is then passed through a line 117 to a steam heater 118 which serves to further heat emulsion from interchanger 89 before it enters the treater A through pipe 9. A float 119 located in the top of the settling tank 2 is connected by suitable mechanical linkage 120 to a control valve 121 for the wet emulsion feed pump 116. In event of the failure or stoppage of the outlets from the settling tank with a resultant rise in the liquid level therein, said float 119 will operate to close valve 121 which is on a steam line 122 to pump 116 and prevent excessive pressures being developed in the treater system. Also, safety valve 123 on gas line 97, 98 is set to operate if pressure in the treater system should rise materially above atmospheric.

The means for electrical supply to the treater comprises a high voltage transformer 125 supplied with low voltage alternating current from the low voltage main line circuit 74 through an impedance 126, connected in series with the circuit breaker 73. The secondary of the high voltage transformer 125 supplies a charging current at high voltage through an impedance 127 to a condenser 128. An interrupter or continuously operating rotary switch 129 intermittently connects the charged condenser 128 through conductors 130 and 131 across the treater terminals 46 and 47 which in turn are connected to the treater electrodes 36 and 37 in the emulsion. The interrupter comprises a rotatable disc 129 provided with two sets of two points, the two sets being connected together, respectively with diametrically opposed connecting bars 132 and 133. Stationary points 134 are provided on conductors 130 and 131 to register intermittently with said points on bars 132 and 133 as the disc rotates, these points being thus connected with the treater terminals 46 and 47 and with the condenser 128. Upon rotation of disc 129 to move the points on the ends of bars 132 and 133 past contacts 134, the circuit between condenser 128 and the treater terminals 46 and 47 is intermittently completed through conductors 130 and 131 and bars 132 and 133. By the interrupter arrangement shown (Figure 1) the condenser is alternately connected to the treater in a reversed sense and operates similarly to the well known mechanical rectifier. A motor M drives the interrupter disc 129 at any desired speed, but preferably at a speed in revolutions per minute, which is a whole or fractional multiple of the synchronous speed. For synchronous operation, motor M may be operated at such multiples of synchronous speed as to supply either interrupted alternating current or interrupted direct current to the treater.

The operation of the dehydrator is as follows: Emulsion to be treated is pumped from storage through a line 115 by pump 116 to the interchanger 88 from where, after being partially heated by indirect heat exchange with outgoing hot oil, it passes through line 117 to steam heater 118 to undergo further heating, and from there it flows into the treater A through line 9 at a temperature ranging from 160° F. to 200° F. This temperature is governed largely to suit the viscosity of the emulsion. The heated emulsion from inlet pipe 9 drops into the treating space between the electrodes 36 and 37 within insulating conduit 13 where it is subjected to an intense interrupted electric field from where it gravitates downward through the field and out of the end thereof into the lower end of the shell section 3 and from there flows through the outlet connection 5 into the settling tank 2 and around and under baffle 84 therein.

The emulsion after being broken or agglomerated in the treater A is allowed to separate by gravity in the relative quiescence of the settling tank 2, the water settling to the bottom and the dry oil rising to the top. The settled water passes out of the bottom of the settling tank through pipe 83 over the water leg 86 and into the funnel 87 from which it is discharged as waste water. The separated oil flows from the top of the tank over the arcuate launder 82 into draw-off pipe 81, through interchanger 88 and from there into surge chamber 90, the dry oil pump 91 delivering the dry oil to storage through line 95. The liquid level float control 92 serves to control the speed of the dry oil pump 91, as previously described, so that the pump is able to deliver the dry oil without appreciable disturbance of the settling tank pressure.

Gas from treater A, settling tank 2 and surge chamber 89 is vented through the pipe connections 70, 71 and 96, respectively, into pipes 97 and 98, and thence to compressor 99. The products pass from compressor 99 through cooler 100 into separator drum 101 where condensed water vapor and light hydrocarbons stratify and are removed. The remaining gases are withdrawn through line 104. A portion of these gases or all of the gases is returned, together with make-up gas from line 109 if necessary, to treater A through line 107 and the two branch lines 48 and 50. The gas which enters through line 50 passes downward within the treater through pipe 52 to the gas distributor orifices 53 where it enters the treated emulsion stream. The gas thus injected into the emulsion stream passes counter-currently upward through the emulsion in the treating zone in the form of finely divided bubbles and into the gas space 35 in the top of the treater, from which it is withdrawn through outlet 70. The action of the upward flowing gas through the emulsion in the treating zone is not entirely known but it has been found to increase greatly the efficiency and effectiveness of the treatment. When necessary or desirable extraneous gases, such as fuel gas, natural gas, nitrogen, or carbon dioxide gas may be introduced through line 109 and used for injection into the treater either alone or mixed with recovered evolved gases from the treater or mixed with each other. In some cases it may be desirable to inject inert gases into the treating zone. The upward flowing gas tends to agitate the emulsion in the treating zone. While other means of agitation may be employed, such as paddles or rotating electrodes or velocity turbulence, it has been found that gas agitation is preferable, both in operation and effectiveness of treatment; and it has also certain insulating functions, all of which are outlined below.

That gas which passes into the treater through gas line 48 serves by reason of its pressure to depress the level of the liquid in space 33 surrounding the insulating conduit 13 to about the point 49 and keep the space 33 filled with gas. This gas space 33 acts to insulate completely the electrodes from the treater shell 3. The valve 58 in the branch line 48 regulated by float 59 through mechanical linkage 57 serves to regulate the gas supply to maintain the liquid level desired.

The emulsion flowing through the treating zone between electrodes 36 and 37 is subjected to the intense intermittent electrical discharge of condenser 128. This electrical discharge is accomplished by connecting said condenser 128 across the treater terminals at regular intervals by means of interrupter or rotary switch 129 rotated by the synchronous motor M at such a speed and phase relationship with respect to the charging current from the transformer 125 that the condenser circuit through the treater A will be completed by the contacts of the interrupter, when the voltage and charge in said condenser is at or near a maximum value. In other words, interrupter disc 129 is preferably revolved by motor M at a speed which is an exact whole or fractional multiple of the alternating current supply frequency as received through supply lines 74. This speed relationship is insured by energizing the synchronous motor M by the same current supply provided through lines 74 for the transformer. Disc 129 of the interrupter is made fast to the motor shaft at such angular relationship with the armature thereof that upon operation as described, stationary point sets 134 will be bridged by revolving point sets on the ends of connecting bars 132 and 133 when the transformer secondary voltage wave is at or near its maximum value. By choice of motor speeds which are whole or fractional mutiples of the synchronous speeds of the feed current, interrupter 129 may be thus caused to deliver either interrupted alternating or interrupted direct current to the treater electrodes. This device and method of rectifying or interrupting alternating current is well known.

Impedance 127 in the high voltage circuit to the condenser serves to cushion the transformer and electrical supply circuits from electrical shocks incident to the completion of the condenser circuit through the treater. Impedances 126 and 127 also act as radio frequency chokes to prevent high frequency electrical surges from the treater circuit reaching the transformer secondary and power supply lines 74. In some cases additional radio frequency chokes are placed in the low voltage supply lines 74 to the transformer primary to prevent such high frequency surges from causing disturbances in the power supply and distribution systems. Impedance 127 also, due to characteristics of such a circuit where inductances and capacities are present, acts to increase the voltage impressed on the condenser 128 over the voltage which the transformer secondary alone would be capable of producing. The impedance 126 in the primary circuit may be used alone, that is, without impedance 127 in the secondary or impedance 127 may be used alone, or both impedances may be used with substantially the same electrical results, as shown. For the impedances represented here as 126 and 127, resistances or inductances may be substituted in certain cases when desirable. In average operation the impedances 126 and 127 have been largely inductive and of very low ohmic resistance.

In average operation a capacity of 0.06 mf. for condenser 128 shown in the drawings, has been found satisfactory but it may range from 0.03 mf. to 0.1 mf. depending upon the emulsion conductivity, "hardness" or other characteristics. The diameter ratios range from 1:3 to 2:3, the maximum efficiency being obtained when the ratio is 1:2. The diameters are the internal diameter of the outer electrode and the external diameter of the inner concentric electrode.

The injection of gas into the treating zone between electrodes has proved to have great importance particularly in treating highly conductive emulsions and an aid in treating all emulsions at a maximum rate with a minimum power consumption. The following table is typical of a treater run according to the present invention illustrating the advantages of gas injection.

TABLE I

*Electrical dehydration with vs. without agitation straight alternating current without interruption*

| Source of emulsion | | Long Beach. |
|---|---|---|
| Treater data | Outer electrode | 7" dia. x 8'-6" effective length. |
| | Inner electrode | 3½" dia. x 8'-6" effective length. |
| Transformer connection | High tension | 16,500 volts. |
| | Low tension | 220 volts. |
| Low tension impedance | (50 cycles) | 0.25 ohms. |

| Electrical data | With gas injection | | | | Without gas injection | | | |
|---|---|---|---|---|---|---|---|---|
| | Run No. 1 | No. 2 | No. 3 | | No. 1 | No. 2 | No. 3 | |
| Power: Kilowatts | 5.6 | 5.4 | 5.5 | | 5.3 | 5.5 | 5.5 | |
| Kw. hr./bbl | 2.3 | 2.5 | 2.6 | | 2.5 | 2.6 | 2.6 | |
| TREATING DATA | | | | | | | | |
| Rate: Bbl./day | 58.3 | 51.5 | 51.5 | | 51.5 | 51.5 | 51.5 | |
| Average treating temperature °F. | 180° F. | 177° F. | 177° F. | | 175° F. | 173° F. | 173° F. | |
| Wet cut percent of water | 52% | 84% | 64% | | 60% | 60% | 64% | |
| Treated oil cuts percent of water | 10.4% | 13.6% | 15.2% | Av. 13.1 | 26.0% | 30% | 28.0% | Av. 28.0 | impedances for average operating conditions may have a total inductance of around .003 henries and an ohmic resistance which is practically negligible.

It has been found advantageous in maintaining the insulators clean on their surfaces and in good condition to inject constantly a small amount of steam into the upper chamber of this treater through inlet connection 66 during treatment. Steam may also be injected into the treater through this connection to displace explosive gas mixtures when starting up treatment or at any other time when such gas mixtures occur.

If the gas-air mixture in the gas space 35 in the top of the treater A reaches a predetermined proportion of air, the automatic switch 73 controlled by gas conductivity cell 72 opens the primary circuit of the high voltage supply and stops treatment.

It has been found that best treating and most efficient operation is obtained when the electrode When operating the treater with an uninterrupted high voltage supply thereto, interrupter 129 shown in Figure 1 is not in operation and contact points 132 and 133 are bridged by suitable conductors to complete the circuit directly from the transformer to the treater; and under this condition of operation condenser 128 is disconnected from the circuit.

It has been found that emulsions of such extreme conductivity and/or high water content that they cannot be separated by any of the ordinary electrical methods can be successfully treated by interrupted current of the type described herein. And particularly efficient and effective treatment can be obtained by the combined and simultaneous use of gas injected into the treating zone and interrupted current. The following table illustrates the comparative advantages of the use of interrupted current and of interrupted current combined with gas injection.

TABLE II

*Electrical dehydration with and without gas agitation interrupted alternating current*
*(Using the same primary source of electric energy as in preceding example)*

| Source of emulsion | | Long Beach. |
|---|---|---|
| Treater data | Outer electrode | 7" dia. x 8'-6" effective length. |
| | Inner electrode | 3½" dia. x 8'-6" effective length. |
| Transformer connection | High tension | 16,500 volts. |
| | Low tension | 220 volts. |
| High-tension capacitors | | 0.0375 microfarads. |
| Low-tension impedance | (50 cycles) | 0.25 ohms. |

TABLE II—Continued

|  | With gas injection | | | Witho[ut] gas injection | |
| --- | --- | --- | --- | --- | --- |
| Electrical data | Run No. 1 | No. 2 | No. 3 | No. 1 | No. 2 |
| Power: Kilowatts | 6 | 6.4 | 6.4 | 8.0 | 8.0 |
| Kw. hr./bbl | 0.95 | 1.02 | 1.02 | 1.47 | 22.3 |
| TREATING DATA | | | | | |
| Rate: Bbl./day | 151 | 151 | | 130 | 8.6 |
| Average treating temperature °F | 191° F. | 193° F. | 192° F. | 200° F. | 199° F. |
| Wet cut percent of water | 52% | 56% | 56% | 64% | 56% |
| Treated oil cuts percent of water | Trace. | Trace. | Trace. | 10.0% | 14.0% | Av. 12% |

The tables above illustrate the advantage obtained in treating with gas injection and with gas injection combined with interrupted current. Thus in Table I it is apparent that other conditions remaining substantially constant, better treating was accomplished while employing uninterrupted alternating current with gas injection than uninterrupted alternating current without gas injection. The average treated oil cut using gas injection with uninterrupted alternating current was 13.1% while the cut obtained without gas injection was 28.0%. Likewise in Table II it is shown that the average treated oil cut obtained by treating with gas injection combined with an interrupted treating current was reduced to a trace while for an interrupted treating current without gas injection it was an average of 12%.

It is to be noted that the treatment in any case using gas injection as described above results in oil having a much lower water content than can be produced operating as above without gas injection. Moreover, it has been found impossible to manipulate any of the other conditions of treatment, such as throughput rate, voltage, etc., to equal the beneficial effect of gas injection.

In addition to increasing the effectiveness of treatment gas injection permits the use of higher potentials than would normally, under like conditions without gas injections, cause persistent short circuiting, resulting in inoperative potentials. On gas injection these short circuits cease. It must be noted, however, that this function of gas injection is of material importance primarily when employing uninterrupted current. It has been found that, when employing the herein described apparatus and method utilizing interrupted currents, even the most conductive emulsion containing water up to 80% may be treated without persistence of short circuiting sufficient to render the voltage within the treater inoperative for dehydration. But it has been shown that the injection of gas in this form of treatment is of material aid to the efficiency of treatment and reduction of water content in the oil.

The voltages supplied by the high voltage transformer may vary from 16,500 for a treater of the type shown in the drawings where the internal diameter of the external electrode is 7 inches and the diameter of the internal electrode is one half of that of the external one, to 33,000 volts where the diameter of the external electrode is 10" with the internal electrode diameter 5". The combination of impedances and capacities, such as shown in the drawings acts to produce peak voltages at the treater which are in excess of those of the transformer secondary open circuit voltages. These voltages may rise under certain emulsion conditions to values as high as 55,000 to 65,000 volts. This phenomenon is important in increasing the effectiveness of this apparatus and process of electrical treatment.

Since the chief advantage of gas injection into the treating zone is presumed to be the benefits of the agitation so produced, it is possible to use other means for agitation purposes. For example the center of the electrode may be mounted for rotation in order to produce by its centrifugal action the desired amount of agitation to prevent persistence of short circuit, the surface of the electrode being modified if desired to enhance this action. However, in general it is preferred to employ the gas in order to take advantage of its ease of control and the absence of movable mechanical parts.

The introduction of gas into the emulsion undergoing treatment appears to have the effect of decreasing the effective cross sectional area and increasing the effective length of the treating zone. This effect may be due to the volume displacement of the gas in the treating zone, with attendant agitation and turbulence.

Insulating tubes 13, 23 and 25 may be constructed of any suitable insulating or dielectric material, such as bakelite, porcelain or glass.

It is to be understood that where the term "intense" is used in this application in reference to the electrical potential that it is intended to indicate any sufficiently high potential adequate to accomplish more or less readily the functions sought. It is pointed out that while an interrupted current is preferred for most purposes, and it is valuable both with and without the use of gas injection for purposes of agitation, the method is by no means limited to the use of an interrupted current, and an uninterrupted current may therefore be employed where advantageous or desirable, an uninterrupted current having considerable value for example in conjunction with the use of gas as a means for agitation. In other words, gas agitation is valuable both with interrupted currents and with uninterrupted currents.

It is to be understood that the foregoing is merely illustrative of one apparatus and method of operation, and that the invention is not limited thereby but may include any method and apparatus within the scope of the disclosure and claims.

I claim:

1. A process for dehydrating petroleum emulsions comprising flowing the emulsion to be treated downward through an elongated vertical interrupted electric treating field, injecting gas into the downward flowing emulsion and causing said gas to rise through said emulsion in said treating field.

2. A process for dehydrating petroleum emulsions comprising passing emulsion downward through an intense interrupted electric treating field at a velocity normally insufficient to prevent persistence of short-circuiting through the emulsion, agitating said emulsion while in said treating field sufficiently to prevent persistence of short-circuiting by passing gas countercurrently upward through the emulsion undergoing treatment in said field, and withdrawing from the lower portion of the treating field all of the liquid undergoing treatment.

3. Apparatus for treating emulsions comprising a housing, a conduit having an opening at its lower end and depending within said housing to provide a gas space within the housing surrounding the conduit, means to close the upper end of said gas space, means to provide an electric treating field within said conduit, means to supply gas to said gas space and to the opening at the lower end of said conduit so that gas will pass upward through said conduit through said treating field, and means to pass emulsion downwardly through said conduit through said treating field.

4. A structure according to claim 3 wherein the conduit is composed of insulating material.

5. A structure according to claim 3 and means connected with said housing adjacent the lower end of said conduit to maintain a predetermined liquid level in the lower end of the gas space surrounding the conduit.

6. A structure according to claim 3 wherein the depending conduit is composed of insulating material, and means connected with the lower end of the housing adjacent the lower end of the conduit to maintain a predetermined liquid level within the gas space surrounding the conduit.

7. Apparatus for treating emulsions comprising a vertically disposed elongated gas tight cylinder, a coaxial insulating conduit centrally supported in said cylinder, means supporting said conduit and dividing said cylinder into upper and lower compartments communicating only through said insulating conduit, means to maintain gas spaces in the upper and lower compartments surrounding said insulating conduit, a pair of electrodes supported in said conduit, means to introduce emulsion to be treated into the upper end of said conduit, means to withdraw treated emulsion from the lower end of said conduit after passing between said electrodes therein, and means to electrically energize said electrodes.

8. In an electrical treater for emulsions, a container having a gas space at the top thereof, an electrical supply for said treater, a gas conductivity cell electrically responsive to the presence of oxygen therein, and connected with said tank, and electrical means actuated by said responsive device to open the electrical supply to said treater when the oxygen therein reaches a predetermined proportion.

HARMON F. FISHER.